(12) United States Patent
Jiang

(10) Patent No.: US 9,239,477 B2
(45) Date of Patent: Jan. 19, 2016

(54) PARALLEL-COUPLED DUAL RACETRACK SILICON MICRO-RESONATOR

(71) Applicant: Rutgers, The State University of New Jersey, New Brunswick, NJ (US)

(72) Inventor: Wei Jiang, Highland Park, NJ (US)

(73) Assignee: RUTGERS, THE STATE UNIVERSITY OF NEW JERSEY, New Brunswick, NJ (US)

( * ) Notice: Subject to any disclaimer, the term of this patent is extended or adjusted under 35 U.S.C. 154(b) by 142 days.

(21) Appl. No.: 13/944,341

(22) Filed: Jul. 17, 2013

(65) Prior Publication Data
US 2014/0023309 A1 Jan. 23, 2014

Related U.S. Application Data

(60) Provisional application No. 61/672,442, filed on Jul. 17, 2012.

(51) Int. Cl.
*G02F 1/025* (2006.01)
*G02F 1/313* (2006.01)

(52) U.S. Cl.
CPC ............... *G02F 1/025* (2013.01); *G02F 1/3133* (2013.01); *G02F 2203/15* (2013.01)

(58) Field of Classification Search
CPC ..... G02F 1/025; G02F 1/3133; G02F 2203/15
USPC ......................................................... 385/2, 3
See application file for complete search history.

(56) References Cited

U.S. PATENT DOCUMENTS

| | | | | |
|---|---|---|---|---|
| 7,245,801 B2* | 7/2007 | Boyd et al. | ...................... | 385/27 |
| 8,385,698 B2* | 2/2013 | Morris et al. | .................... | 385/40 |
| 8,519,803 B2* | 8/2013 | McLaren et al. | ............. | 333/17.1 |
| 8,625,936 B1* | 1/2014 | Dong | ................................ | 385/3 |
| 8,644,649 B2* | 2/2014 | Meade et al. | ...................... | 385/2 |
| 8,718,421 B2* | 5/2014 | Morton | .................. | G02F 1/011 385/27 |
| 8,805,130 B2* | 8/2014 | Lipson et al. | ................... | 385/14 |

OTHER PUBLICATIONS

Wei Jiang et al., "Parallel-coupled dual racetrack silicon micro-resonators for quadrature amplitude modulation", Jul. 19, 2011, Optics Express, vol. 19, No. 16, pp. 14892-14902.*

* cited by examiner

*Primary Examiner* — Daniel Petkovsek
(74) *Attorney, Agent, or Firm* — Fox Rothschild LLP

(57) ABSTRACT

An apparatus, resonator and method for modulating light including a mechanism to compensate for parameter deviations. The apparatus may be capable of phase shift keying and quadrature amplitude modulation, and includes a waveguide, a plurality of micro-resonators, and an electronic structure. The plurality of micro-resonators are positioned adjacent to the waveguide and have a parameter deviation in at least one resonator characteristic. The electronic structure is electrically biased so as to cause electro-optic modulation of amplitude and a phase of the light output by the apparatus, each bias voltage comprising a numerical offset that is determined based upon the parameter deviation, thereby reducing any overall effect caused by the material or manufacturing imperfections. An electronic encoder may provide driving voltage levels for phase shift keying or quadrature amplitude modulation. The number of output amplitude and phase states of light depends on the number of output voltage levels of the encoder.

19 Claims, 10 Drawing Sheets

PARALLEL-COUPLED DUAL RACETRACK SILICON MICRO-RESONATOR

RELATED APPLICATION AND CLAIM OF PRIORITY

This application claims the priority benefit of U.S. Provisional Application No. 61/672,442 entitled "Parallel-Coupled Dual Racetrack Silicon Micro-Resonator," and filed Jul. 17, 2012, the content of which is hereby incorporated by reference in its entirety.

STATEMENT REGARDING FEDERALLY SPONSORED RESEARCH OR DEVELOPMENT

This application was developed with U.S. Government support under Grant No. FA9550-10-C-0049 and Grant No. FA-9550-08-1-0394, both of which were awarded by the Air Force Office of Scientific Research. The U.S. Government has certain rights in this application.

BACKGROUND OF THE INVENTION

1. Statement of the Technical Field

The present disclosure relates to optical modulation devices, and more particularly to resonator-based optical modulators.

2. Description of the Related Art

Advanced optical modulation formats could offer significant advantages for optical communications. For example, Quadrature Phase-Shift Keying ("QPSK") provides higher spectral efficiency, better tolerance to fiber nonlinearly and chromatic dispersion, and enhanced receiver sensitivity compared to on-off keying. Traditional Lithium Niobate ("LiNbO$_3$") modulators can be used for such modulation. However, LiNbO$_3$ modulators are relatively large in size. For a general M-ary modulation format that requires a large number of optical modulator components along with their driving signal circuitries, the overall size of the entire modulator is rather cumbersome. Recent breakthroughs in silicon photonics, particularly silicon based optical modulators, have fundamentally changed the landscape of modulator technology. Notably, micro-resonator based silicon modulators constitute an ideal candidate for optical modulation due to their compact size, low power consumption, and ease of monolithic integration with driving circuitries on the same silicon chip. Most research on silicon micro-ring modulators employed intensity modulation in binary formats. Recently, micro-ring resonator based modulators for differential binary phase-shift-keying and differential QPSK have been proposed, and satisfactory performances have been predicted. Another work employed the anti-crossing between paired amplitude and phase resonators and demonstrated enhanced sensitivity to the input drive signal. A high-Q micro-ring quadrature modulator incorporating dual 2×2 Mach-Zehnder interferometers has also been recently proposed with beneficial performance.

SUMMARY

The invention concerns systems, devices and methods related to optical modulation devices, and more particularly to resonator-based optical modulators. For example, in one example scenario, an apparatus for modulating an amplitude and a phase of light includes a waveguide capable of transmitting light therethrough, a plurality of micro-resonators adjacent to the waveguide which have at least one parameter deviation in at least one resonator characteristic as a result of material or manufacturing imperfections, and an electronic structure, formed in each of said plurality of micro-resonators, that is electrically biased so as to cause electro-optic modulation of an amplitude and a phase of the light, wherein each bias voltage for the electronic structure comprises a numerical offset that is determined based upon the at least one parameter deviation.

In another example scenario, an example of a resonator includes a substrate, a waveguide formed on the substrate and capable of allowing a transmission of a light signal therethrough, at least two racetrack resonators formed on the substrate so as to be located on opposite sides of the waveguide and having parameter deviations in at least one resonator characteristic, a first set of electrical contacts disposed adjacent to a first resonator of the racetrack resonators, and a second set of electrical contacts disposed adjacent to a second resonator of the racetrack resonators. In this scenario, at least one of an amplitude and a phase of the light signal is dynamically varied, by an electrically biased electronic structure, so as to cause an electro-optic modulation of the amplitude and phase of the light signal, and each bias voltage of the first and second sets of electrical contacts comprises a numerical offset that is determined based upon the parameters deviations in at least one resonator characteristics.

In another example scenario, a sample method for converting symbols expressed by a voltage signal to symbols expressed by a light signal, includes transmitting light through a waveguide located adjacent to first and second resonators of a micro-resonator which have at least one parameter deviation in at least one resonator characteristic and sequentially applying a plurality of different bias voltages to an electronic structure of the micro-resonator so as to cause electro-optic modulation of an amplitude and a phase of the light. In this sample scenario, each bias voltage of the electronic structure of each micro-resonator includes a numerical offset, the numerical offset being determined based upon the at least one parameter deviation in at least one resonator characteristics.

BRIEF DESCRIPTION OF THE DRAWINGS

Embodiments will be described with reference to the following drawing figures, in which like numerals represent like items throughout the figures, and in which.

DETAILED DESCRIPTION

Figure 1:
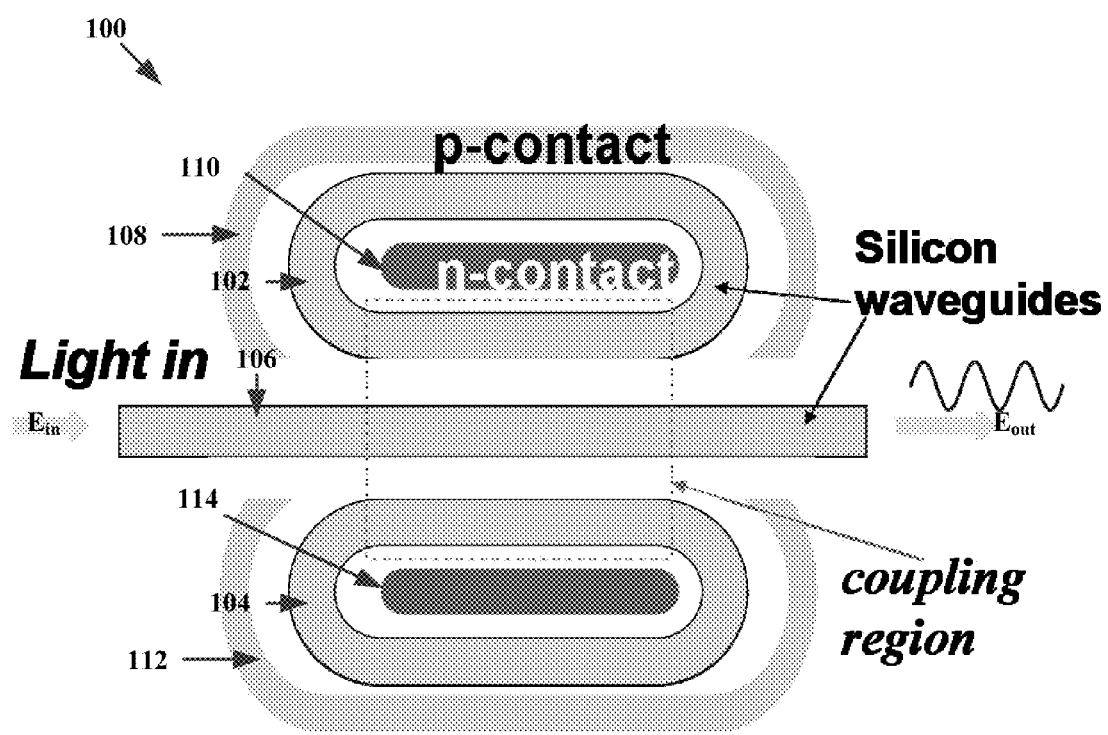
FIG. 1 is a schematic illustration of an exemplary Parallel-Coupled Dual Racetrack ("PCDR") micro-resonator that is useful for understanding various embodiments of the present disclosure.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present disclosure may be embodied in other specific forms without departing from its spirit or essential characteristics. The described embodiments are to be considered in all respects only as illustrative and not restrictive. The scope of the disclosure is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Thus, discussions of the features and advantages, and similar language, throughout the specification may, but do not necessarily, refer to the same embodiment.

Furthermore, the described features, advantages and characteristics of the disclosure may be combined in any suitable manner in one or more embodiments. One skilled in the relevant art will recognize, in light of the description herein, that the teachings of the disclosure made herein can be practiced without one or more of the specific features or advantages of a particular embodiment. In other instances, additional features and advantages may be recognized in certain embodiments that may not be present in all embodiments of the disclosure.

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to."

Reference throughout this specification to "one embodiment", "an embodiment", or similar language means that a particular feature, structure, or characteristic described in connection with the indicated embodiment is included in at least one embodiment of the present disclosure. Thus, the phrases "in one embodiment", "in an embodiment", and similar language throughout this specification may, but do not necessarily, all refer to the same embodiment.

The present disclosure concerns a PCDR micro-resonator. The PCDR micro-resonator may be employed in a modulator implementing a Phase Shift Keying ("PSK") modulation scheme and an Quadrature Amplitude Modulation ("QAM") scheme. PSK modulation generally involves converting a symbol expressed via a voltage signal to a symbol expressed via a light signal. The phase of the light signal defines the symbol expressed thereby. Two commonly used PSK schemes are binary phase shift keying (BPSK), which uses two phase states, and quadrature phase shift keying, which uses four phase states. In contrast, in QAM modulation, it is the intensity and phase of a light signal that defines a symbol expressed thereby. Therefore, the PCDR micro-resonator of the present disclosure is configured to convert a symbol expressed via a voltage signal to a symbol expressed via a light signal, where the intensity and/or phase of the light signal defines the symbol expressed thereby.

A schematic illustration of an exemplary PCDR micro-resonator 100 is provided in FIG. 1. A graph 200 plotting an intensity of a light signal $E_{out}$ output from the PCDR micro-resonator 100 verse a wavelength of a light signal $E_{in}$ input to the PCDR micro-resonator 100 is provided in FIG. 2. A graph 300 plotting a phase of the light signal $E_{out}$ verse the wavelength of the light signal $E_{in}$ is provided in FIG. 3.

As shown in FIG. 1, the PCDR micro-resonator 100 comprises two resonators 102, 104 having the same or similar elliptical shape. The resonators 102, 104 are symmetrically side-coupled in parallel to a through-waveguide 106. The resonators 102, 104 may have deviations in at least one resonator characteristic as a result of a fabrication technique employed to fabricate the PCDR micro-resonator 100. The term "deviation", as used herein, means the difference between the actual value of a parameter of a fabricated micro-resonator and the designed value of that parameter. The resonator characteristics can include, but are not limited to, an effective optical path length, a quality factor or a coupling constant between one of the plurality of micro-resonators and the waveguide. In scenarios where such deviations exist, the deviations may be counteracted by utilization of a plurality of bias voltages for an electrical structure 108, 112, 110, 114 which have different numerical offsets from ideally designed voltage values. Stated differently, "irregular bias voltage offsets" may be employed to counter-act such deviations. For example, the designed bias voltages for the first resonator 102 of a QPSK modulator to achieve four states (having, for example, phase values of 45 degrees, 135 degrees, 225 degrees, and 315 degrees) may be 0.5, 1.0, 2.5 and 3.5 volts, respectively. According to an ideal design, the above four bias voltages should be applied to the p-contact 108 and the n-contact 110. However, due to parameter deviation of the fabricated resonator, the actual bias voltages of the first resonator needed to achieve the four QPSK phases states may be changed to 0.3, 0.8, 2.1 and 3.2 volts, respectively. In this case, the irregular bias voltage offsets for the first resonator are $-0.2$, $-0.2$, $-0.4$ and $-0.3$ volts, respectively. The second resonator may also have a different set of irregular bias voltages based upon any parameter deviations caused by the fabrication of the second resonator. Embodiments of the present disclosure are not limited in this regard. Any numerical offsets may be used in accordance with a particular application. The "irregular bias voltage offsets" allow the recovery of maximum coverage of amplitude and phase states despite the uncontrollable deviations of the resonator characteristics.

Referring again to FIG. 1, the electrical structure comprises two p-contact portions 108, 112 and two n-contact portions 110, 114. The p-contact and n-contact portions provide a means for dynamically controlling the intensity and phase of a light signal $E_{out}$ output from the PCDR micro-resonator 100. This dynamic control is facilitated by the application of different voltages to the contact pairs 108/110 and 112/114. For example, a positive two volt signal is applied across contacts 108 and 110. A negative two volt signal is applied across contacts 112 and 114. When no bias voltages are applied, the light signal $E_{out}$ output from the PCDR micro-resonator 100 has a first intensity and a first phase. In contrast, the light signal $E_{out}$ has a second different intensity and a second different phase when a positive two volt signal is applied across contacts 108 and 110 and a negative two volt signal is applied across contacts 112 and 114. Consequently, the applied voltages enable applicability of the PCDR micro-resonator 100 in PSK, QAM and/or QPSK situations. Notably, the voltage signals applied to the two contact pairs 108/110 and 112/114 may have the same or different polarity. The advantages of applying signals with the same or different polarities will become more evident as the discussion progresses.

A distinct advantage as taught in the present disclosure is that the number of symbols that output light signals can be increased significantly through adding new sets of digitized bias voltages without adding new resonators. For example, to upgrade a QPSK modulator that requires four symbols to a 16-QAM modulator that requires 16 symbols, the techniques as described herein teach that an encoder may be changed from a relatively simple 4-output-level encoder to a relatively sophisticated 16-output-level encoder while the overall number of resonators remains two. Alternative methods to achieve 16-QAM generally require more resonators (e.g., 8 to 16 resonators). Generally, an optical resonator has a much larger area compared to electronic devices such as transistors used to construct the encoders. Using the techniques as described herein, any increase in overall device area from a 4-output-level encoder to a 16-output-level encoder may be substantially smaller than the overall device area increase of the alternative methods based upon adding more resonators. Generally, smaller devices (such as those created using the techniques described herein) are preferred as they cost less in manufacturing.

Figure 4:
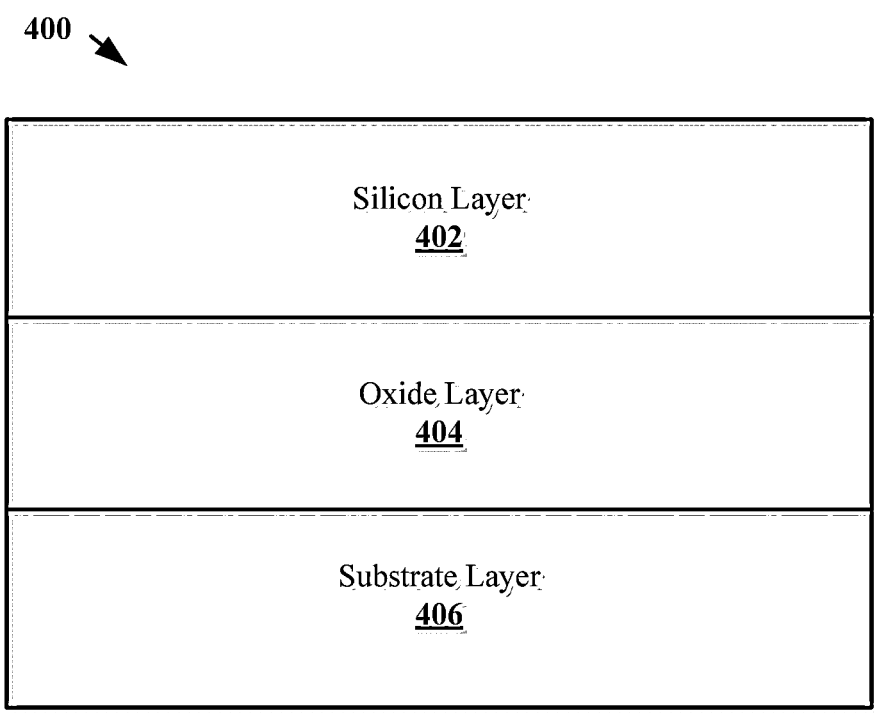
FIG. 4 is schematic illustration of a Silicon-On-Insulator ("SOI") wafer.

In some embodiments, the PCDR micro-resonator 100 may be fabricated on an SOI wafer. A schematic illustration of an exemplary SOI wafer 400 is provided in FIG. 4. The SOI wafer 400 comprises a silicone layer 402, an oxide layer 404 and a substrate layer 406. The resonators 102, 104 and through-waveguide 106 are formed by etching the silicon layer 402 of the SOI wafer 400. The p-contacts 108, 112 are formed by introducing dopants into the silicon layer 402. These doped areas of the SOI wafer 400 contain extra amounts of charge carriers. The dopants may be introduced via an injection technique. In this scenario, the plasma dispersion effect of the injected carriers causes a change of refractive index $\Delta n_1$, $\Delta n_3$ in each resonators 102, 104, respectively. As a result of the refractive index change, the cross-coupled resonances of the resonators 102, 104 are modified.

By carefully choosing the voltage signals applied to each resonator 102, 104, the amplitude and phase of an output optical signal $E_{out}$ may be controlled to generate arbitrary PSK symbols, QAM symbols and QPSK symbols.

A distinctive feature of the PCDR micro-resonator 100 is that the coherent cross-coupling between the resonators 102, 104 mediated by the through-waveguide 106 drastically modifies the amplitude and phase characteristics of resonance. This enables M-ary quadrature signal generations including QPSK. The outcome of the cross-coupling of the resonances is fairly complex. However, analysis has shown that it can be understood through the direct sum and coherent "interaction" of the optical characteristics of two individual resonators as presented below.

In an embodiment, the cross-coupling between the resonators 102, 104 is analyzed and the output transfer function of the proposed structure is presented. The critical coupling condition is obtained. Systematic studies of the over-coupled, critically coupled, and under-coupled scenarios for the parallel-coupled resonators 102, 104 indicate that strong over-coupling case is desired for arbitrary M-ary quadrature signal generation. The interaction between the resonances of the resonators 102, 104 is analyzed, and its critical role in M-ary quadrature signal generation is presented. The effects of asymmetries in the coupling strengths and quality factors of the resonators 102, 104 are systematically studied, and phase compensations for such asymmetries are presented. Lastly, the electrical aspects of the proposed PCDR micro-resonator base modulators are examined.

The coupling between the resonators 102, 104 and the through-waveguide 106 may be described by multi-waveguide coupling theory. Multi-waveguide coupling theory is well known in the art, and therefore will not be described herein. Still, it should be appreciated that the input fields and output fields of the PCDR micro-resonator 100 may be defined by the following mathematical equations (1) and (2), respectively.

$$E_n^{(in)}(x,y,0)=M_n(x,y)u_n(0)=M_n(x,y)a_n \quad (1)$$

$$E_n^{(out)}(x,y,L)=M_n(x,y)\exp(i\beta L)u_n(L)=M_n(x,y)b_n \quad (2)$$

where $a_n$ and $b_n$ are the normalized input and output complex amplitudes of the PCDR micro-resonator 100, respectively. The solution of mathematical equations (1) and (2) yields the following mathematical equation (3).

$$\begin{bmatrix} b_1 \\ b_2 \\ b_3 \end{bmatrix} = \exp(i\beta L) \begin{bmatrix} c_1 + 1/2 & c_2 & c_1 - 1/2 \\ c_2 & 2c_1 & c_2 \\ c_1 - 1/2 & c_2 & c_1 + 1/2 \end{bmatrix} \begin{bmatrix} a_1 \\ a_2 \\ a_3 \end{bmatrix}, \quad (3)$$

where $$c_1 = \frac{1}{2}\cos\left(\sqrt{2}\,\kappa L\right),$$

$$c_2 = \frac{1}{\sqrt{2}}i\sin\left(\sqrt{2}\,\kappa L\right).$$

The strength of the cross-coupling between the resonators 102, 104 mediated by the through-waveguide 106 is given by $|c_1 - \frac{1}{2}|$. In addition, light propagation along a resonator 102, 104 gives rise to the relations defined by the following mathematical equations (4) and (5).

$$a_1 = \eta_1 \exp(i\theta_1) b_1 \quad (4)$$

$$a_3 = \eta_3 \exp(i\theta_3) b_3 \quad (5)$$

where the amplitude attenuation along a resonator 102, 104 is given by $\eta_n<1$, and the phase shift is given by $\theta_n$. Assuming a unity input amplitude $a_2=1$, the amplitude $b_2$ of light signal $E_{out}$ output from the PCDR micro-resonator 100 may be solved using mathematical equations (3), (4) and (5). The amplitude $b_2$ may be defined by the following mathematical equation (6).

$$E_{out} = b_2 = \frac{e^{i\phi}[-(1/2-c_1)(\Delta u_1 + \Delta u_3) + 2c_1 \Delta u_1 \Delta u_3]}{(1/2-c_1)(\Delta u_1 + \Delta u_3) + \Delta u_1 \Delta u_3},$$

where $\phi=\beta L$ and $$\Delta u_n \equiv \frac{1}{e^{i\phi+i\theta_n}\eta_n} - 1,$$

$n=1,3$. Because of the symmetry of the PCDR micro-resonator 100, the mathematical equation (6) only involves terms symmetric with respect to an interchange of $\Delta u_1$ and $\Delta u_3$. As such, the symmetry of the PCDR micro-resonator 100 may be utilized to help simplify the understanding of the device principles. Detailed analysis of the PCDR micro-resonator 100 is provided in the following sections.

The critical coupling condition for a modulated over-coupled structure may be obtained by setting the amplitude $b_2$ in mathematical equation (6) equal to zero. For the resonators 102, 104 without modulation ($\Delta u_3 = \Delta u_3$), a critical coupling condition may be expressed by the following mathematical equation (7).

$$\eta_1 = 2c_1 = \cos\sqrt{2}\kappa L. \tag{7}$$

The asymmetric cases will be discussed in additional detail below.

For the PCDR micro-resonator 100, the phase shift $\theta_n$ in each resonator 102, 104 is a linear function of the refractive index changes $\Delta n_n$ due to carrier injection or depletion in the respective resonator 102, 104. Therefore, the amplitude $b_2$ of the light signal $E_{out}$ output from the PCDR micro-resonator 100 depends on the refractive index changes $\Delta n_n$ through the phase shift terms. To understand the modulation characteristics, it is helpful to rewrite mathematical equation (6) so as to obtain the following mathematical equation (8).

$$b_2 = e^{i\phi}\left[-1 + \frac{(2c_1+1)}{(1/2-c_1)(1/\Delta u_1 + 1/\Delta u_3) + 1}\right]. \tag{8}$$

Figure 2:
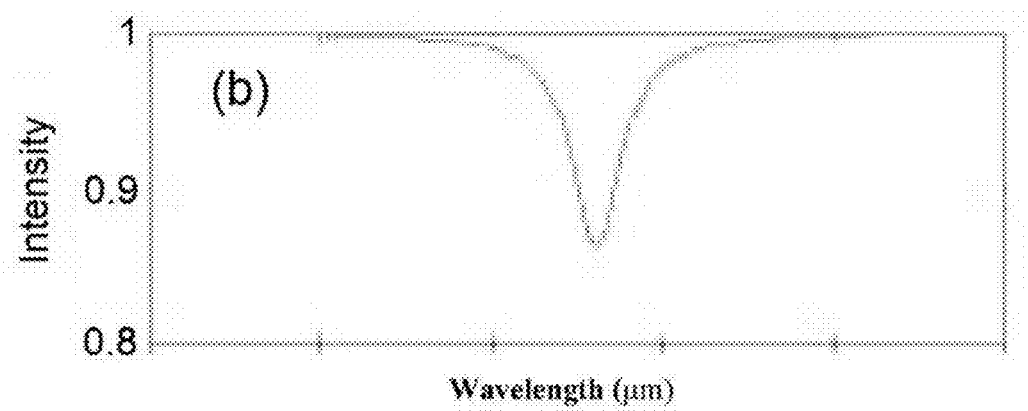
FIG. 2 provides a graph plotting an intensity of a light signal $E_{out}$ output from the PCDR micro-resonator shown in FIG. 1 verse a wavelength of a light signal $E_{in}$ input to the PCDR micro-resonator shown in FIG. 1.
Figure 3:
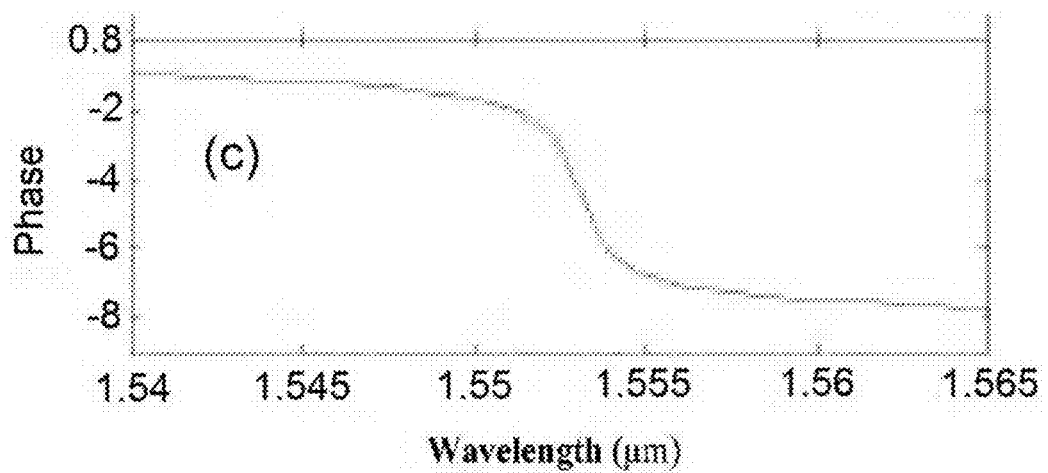
FIG. 3 provides a graph plotting a phase of the light signal $E_{out}$ verse the wavelength of the light signal $E_{in}$.

As $c_1$ is a real number, for a modulated symmetric ($\eta 1 = \eta_3$) PCDR micro-resonator 100, the amplitude $b_2$ of the light signal $E_{out}$ output therefrom may vanish only if $\Delta u_1 = \Delta u_3^*$. Even if the critical coupling condition of mathematical equation (7) is not satisfied in absence of modulation, the modulated amplitude may still vanish under the modulation condition expressed by the following mathematical equations (9) and (10).

$$\phi + \theta_1 = 2m_1\pi - \Delta\theta, \tag{9}$$

and $$\phi + \theta_3 = 2m_3\pi + \Delta\theta$$

$$\cos\Delta\theta = \eta_1\left[1 + \frac{c_1(1/\eta_1^2 - 1)}{c_1 + 1/2}\right] \tag{10}$$

where $m_1$ and $m_3$ are two integers. For real nonzero $\Delta\theta$, this may require $\eta_1 > 2c_1 = \cos\sqrt{2}\kappa L$, which corresponds to over-coupling in comparison to mathematical equation (8). The spectra of an over-coupled PCDR micro-resonator 100 (without modulation) are illustrated in FIGS. 2 and 3.

For intensity and phase modulation, the refractive index of silicon waveguides in each resonator 102, 104 is varied on the order of 0.001. Such an amount of $\Delta n$ may be achieved with carrier concentration changes $\Delta N_e$, $\Delta N_h \sim 3 \times 10^{17}$ cm$^{-3}$ according to a well-known plasma dispersion relation described, for example, in an article entitled "Electrooptical Effects in Silicone" written by R. A. Soref and B. E. Bennett and published in 1987.

Figures 5, 6:
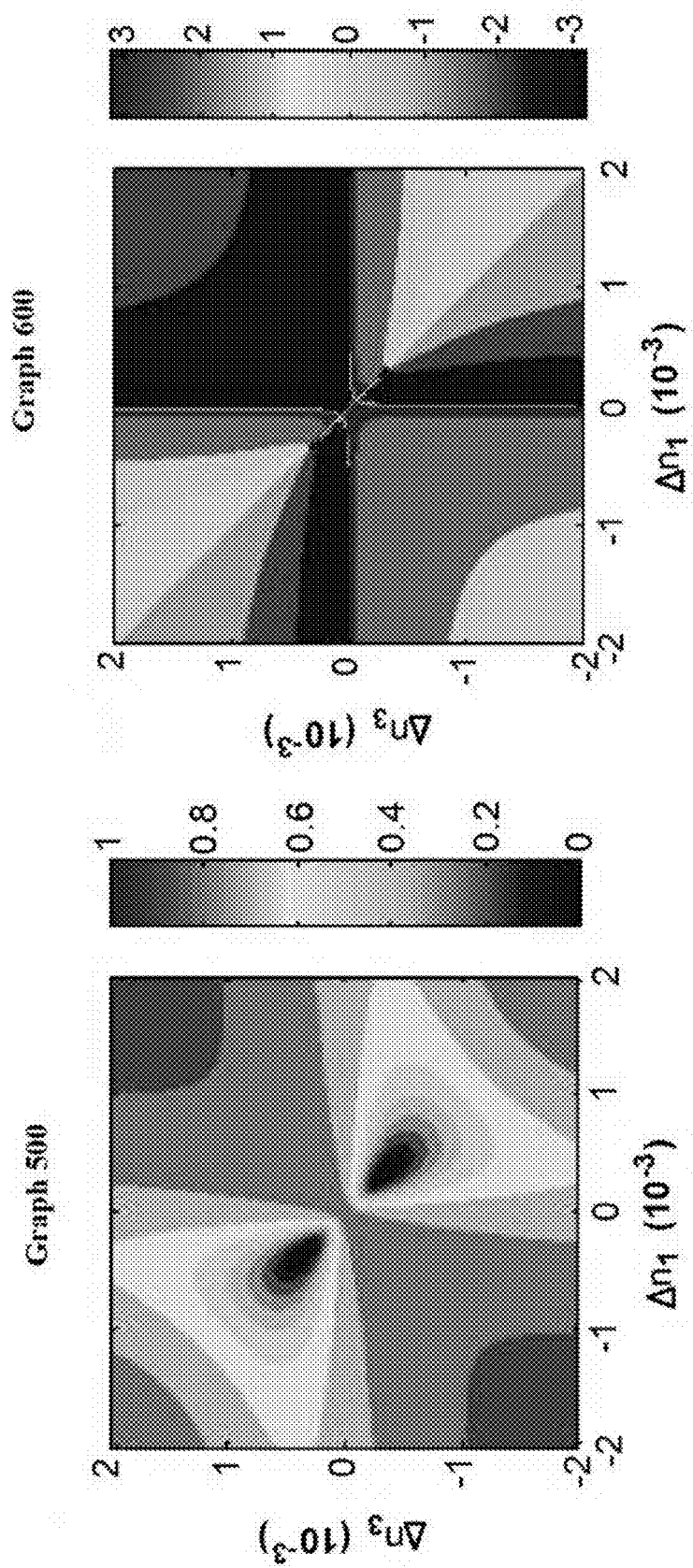
FIG. 5 provides a graph illustrating intensity variations of a light signal $E_{out}$ output from the PCDR micro-resonator of FIG. 1 as a result of refractive index modulation.
FIG. 6 provides a graph illustrating phase variations of a light signal $E_{out}$ output from the PCDR micro-resonator of FIG. 1 as a result of refractive index modulation.

A graph 500 is provided in FIG. 5 which illustrates intensity variations of the light signal $E_{out}$ output from the PCDR micro-resonator 100 as a result of refractive index modulation (i.e., the application of voltage signals to contact pairs 108/110 and 112/114). A graph 600 is provided in FIG. 6 which illustrates phase variations of the light signal $E_{out}$ output from the PCDR micro-resonator 100 as a result of refractive index modulation. The intensity and phase variations are illustrated in FIGS. 5 and 6 as a function of refractive index variations $\Delta n_1$ and $\Delta n_3$ at a resonant wavelength for an over-coupled PCDR micro-resonator 100. The PCDR micro-resonator 100 parameters are $r_1 = r_3 = 3$ μm, $L = 3$ μm, $\eta_1 = \eta_3 = 0.994$, $c_1 = 0.42343$. As shown in FIGS. 5-6, the intensity and phase of a light signal $E_{out}$ output from the PCDR micro-resonator 100 varies to a larger degree when the two voltage signals applied to the contact pairs 108/110 and 112/114 have different polarities. Therefore, there are certain advantageous to using different polarity voltage signals in PSK and QAM scenarios, as opposed to using same polarity voltage signals.

Figures 7A, 7B, 7C, 7D, 7E, 7F:
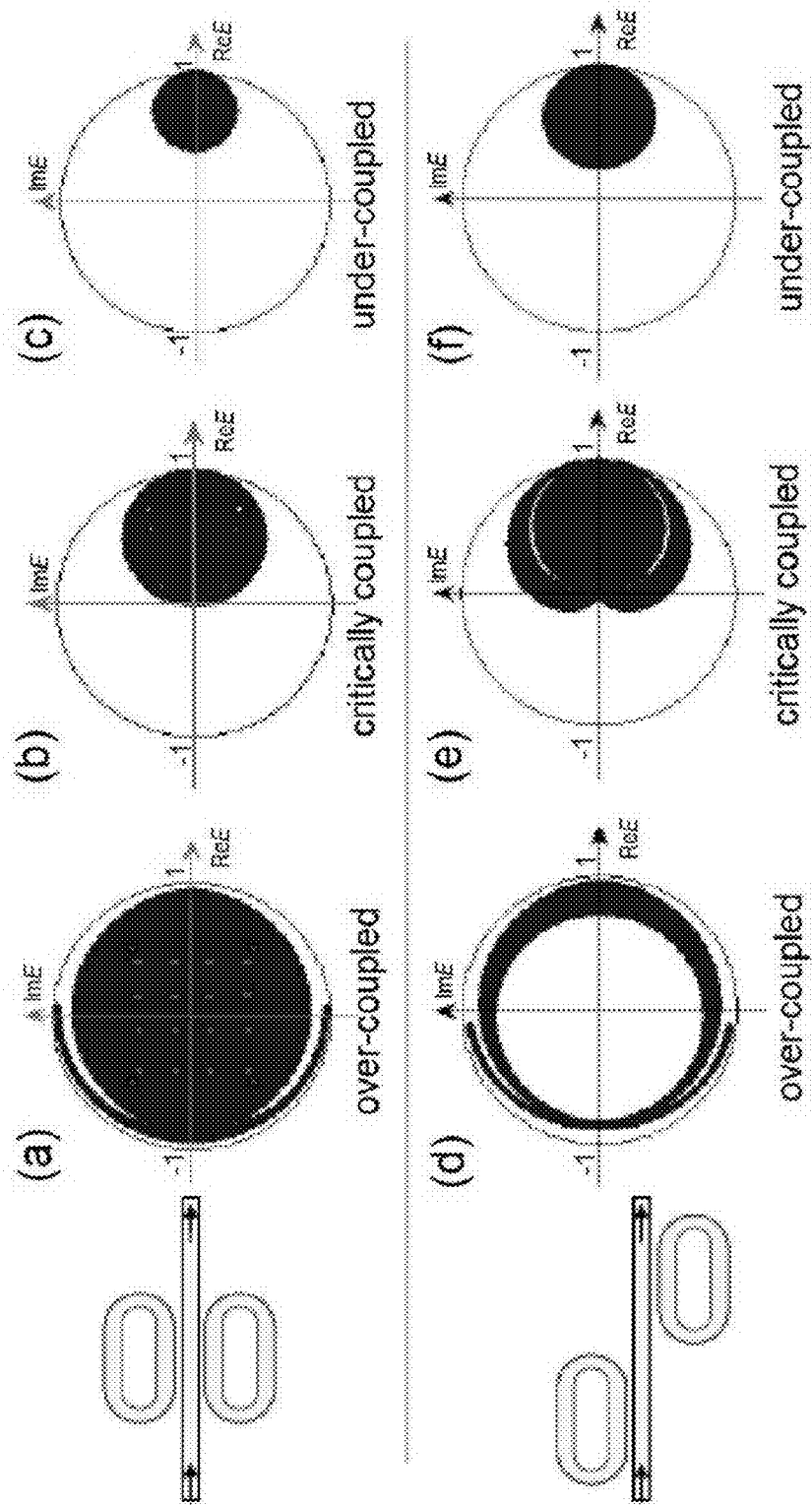
FIGS. 7(a)-7(f) provide graphs illustrating a mapping of a normalized complex output field amplitude on a complex plane for a refractive index varying in a range of −0.002~0.002.

To visualize the complex amplitude, $E_{out}(\Delta n_1, \Delta n_3)$, for M-ary signal generations, the ensemble of complex $b_2$ values for all values of $\Delta n_1$ and $\Delta n_3$ are mapped onto the complex plane of the normalized output electric field, as shown by FIGS. 7(a)-7(f). In FIG. 7(a), each black point gives the amplitude and phase of the output signal $E_{out}$ for a particular pair of $\Delta n_1$, $\Delta n_3$ values in the aforementioned range. Evidently, the ensemble of black points covers most part of the unit circle (the symbol space), therefore, allowing for the access of a wide range of amplitude and phase values. A close examination of FIGS. 5-6 indicates that the intensity and phase varies widely in the second and fourth quadrants where $\Delta n_1$ and $\Delta n_3$ have opposite signs, which corresponds to a push-pull configuration. In contrast, the intensity and phase are much less sensitive to $\Delta n_1$ and $\Delta n_3$ when they have the same sign. Indeed, simulations indicated that the push-pull configuration is usually responsible for over 80% of coverage on the complex E plane. Hence, a push-pull modulation configuration may provide certain advantages over configurations in which the voltage signals have the same sign (or polarity).

It should be noted that the broad coverage inside the unit circle observed in FIG. 7(a) is a signature of the strong cross-coupling between the two resonators 102, 104 mediated by the through-waveguide 106. To illustrate this point, the simulated typical coverage of a critically coupled case and an under-coupled case is shown in FIGS. 7(b) and 7(c), respectively, for the parallel-coupled dual racetrack resonators. In addition, the simulated typical coverage for two uncoupled racetrack resonator in series is plotted in FIGS. 7(d)-7(f). None of the cases illustrated in FIGS. 7(b)-7(f) has adequate coverage for arbitrary M-ary quadrature signal generation.

The cross-coupling present in the parallel coupled racetrack resonators helps only the over-coupling case to achieve sufficient coverage over all four quadrants inside the unit circle. It may be shown that such a behavior stems from a delicate balance between the direct sum term $\Delta u_1 + \Delta u_3$ and the "interaction" term $\Delta u_1 \Delta u_3$ on both the numerator and denominator in mathematical equation (6). Based on their definition $\Delta u_n = (1 - e^{i\phi + i\theta_n} \eta_n)/e^{i\phi + i\theta_n} \eta_n$, $\Delta u_n$ may be regarded as the normalized change of the field amplitude after one round-trip propagation in a racetrack resonator 102, 104. Here the initial field amplitude is unity, and the amplitude change is normalized by the final field amplitude $e^{i\phi + i\theta_n} \eta_\kappa$. For a racetrack resonator 102, 104 without modulation ($\Delta n_1 = \Delta n_3 = 0$), $\Delta u_i$ is small (on the order of $1 - \eta_1$) near resonance, and $\Delta u_1$ and $\Delta u_3$ are in phase. Therefore, we find $|\Delta u_1 \Delta u_3| \ll |(\frac{1}{2} - c_1)(\Delta u_1 + \Delta u_3)|$ because $1 - \eta_1 < 2(\frac{1}{2} - c_1)$ according to the strong coupling condition. The dominance of the direct sum term in mathematical equation (6) yields an output amplitude close to $-1$. With sufficient modulation in a push-pull configuration, $\Delta u_n$ may gain large imaginary parts ($\text{Im}(\Delta u_n) \sim \Delta \theta_n$, up to $\pm 0.09$ at $\Delta n_n = 0.001$) with opposite signs whereas their real parts remain small. Therefore, the product term exceeds the sum by a large margin, $|u_1 \Delta u_3| \gg |\Delta u_1 + \Delta u_3|$ such that $(\frac{1}{2} - c_3)(\Delta u_3 + \Delta u_3)$ and $\Delta u_3 \Delta u_3$ in mathematical equation (6) become comparable. Now the output amplitude may take virtually any value. Particularly, the two terms in the numerator may cancel each other so that the output amplitude vanishes. Hence, the large dynamic range of $|(\frac{1}{2} - c_1)(\Delta u_1 + \Delta u_3)/\Delta u_1 \Delta u_3|$ in the over-coupling case causes the output amplitude given by mathematical equation (6) to vary widely, traversing a large fraction of the area in the unit circle. Thus, the output amplitude and phase have a large dynamic range. In contrast, for an under-coupling case, it is straightforward to show that, in general, $|(\frac{1}{2} - c_1)(\Delta u_1 + \Delta u_3)| < |\Delta u_3 \Delta u_3|$. The dominance of the "interaction" term limits the accessible area in the unit circle.

As two racetrack resonators 102, 104 are included in the PCDR micro-resonator 100, their asymmetry due to fabrication imperfections may be a concern for practical applications. Note that the relatively long straight segments of the resonators 102, 104 ensure that the cross-coupling therebetween is insensitive to small misalignment between the left and right resonators 102, 104. This arrangement provides a robustness of device performance and reliability as the structure, e.g., the QAM structure as described herein, is resilient against device parameter deviation due to fabrication-induced perfection. Particularly, the deviation of the coupling constant and quality factor of the resonators may be compensated for through active control of the resonators to achieve sufficient coverage of the amplitude-phase space.

As two resonators 102, 104 may be patterned in one e-beam lithography process with a typical positioning accuracy of 20 nm or better, the misalignment is estimated less than 1% for a coupling length L>2 μm. Optical path differences between the two resonators 102, 104 may usually be compensated by a proper DC bias or by additional thermo-optic heaters. However, the asymmetries in quality factors and coupling ratios cannot be directly compensated as easily. Therefore, their impacts on the device performance must be evaluated.

For three parallel waveguides with asymmetric coupling constants, the coupled mode mathematical equations may be written as follows.

$$\frac{d}{dz}\begin{bmatrix} u_1(z) \\ u_2(z) \\ u_3(z) \end{bmatrix} = i \begin{bmatrix} 0 & \kappa_{12} & 0 \\ \kappa_{12} & 0 & \kappa_{23} \\ 0 & \kappa_{23} & 0 \end{bmatrix} \begin{bmatrix} u_1(z) \\ u_2(z) \\ u_3(z) \end{bmatrix}, \quad (11)$$

where the coupling constants between waveguide pairs (1,2) and (2,3) are $\kappa_{12}$ and $\kappa_{23}$, respectively. To solve such a differential equation, $d/dz[u_m] = i[\kappa_{mn}][u_n]$, the coupling matrix is decomposed into the following form $[\kappa_{mn}] = X\Lambda X^+$, where $\Lambda$ is a diagonal matrix whose diagonal elements are the eigenvalues of the matrix $[\kappa_{mn}]$, the columns of X are the eigenvectors of $[\kappa_{mn}]$, and $XX^+ = 1$. The original mathematical equation may then be integrated according to $$[u_m(z)] = \exp(i[\kappa_{mn}]z)[u_n(0)] = X\exp(i\Lambda z)X^+[u_n(0)]. \quad (12)$$

Thus the solution of mathematical equation (11) is given by mathematical equation (13).

$$\begin{bmatrix} u_1(z) \\ u_2(z) \\ u_3(z) \end{bmatrix} = \begin{bmatrix} \cos(\kappa, z)\rho_1^2 + \rho_3^2 & i\sin(\kappa, z)\rho_1 & \cos(\kappa, z)\rho_1\rho_3 - \rho_1\rho_3 \\ i\sin(\kappa, z)\rho_1 & \cos(\kappa, z) & i\sin(\kappa, z)\rho_3 \\ \cos(\kappa, z)\rho_1\rho_3 - \rho_1\rho_3 & i\sin(\kappa, z)\rho_3 & \cos(\kappa, z)\rho_3^2 + \rho_1^2 \end{bmatrix} \begin{bmatrix} u_1(0) \\ u_2(0) \\ u_3(0) \end{bmatrix}, \quad (13)$$

where $\kappa_+ = \sqrt{\kappa_{12}^2 | \kappa_{23}^2}$, $\rho_1 = \kappa_{12}/\kappa_+$, and $\rho_3 = \kappa_{23}/\kappa_+$. In a symmetric case, $\kappa_+ = \sqrt{2}\kappa_{12} = \sqrt{2}\kappa_{23} = \sqrt{2}\kappa$, $\rho_1 = \rho_3 = 1/\sqrt{2}$, mathematical equation (13) returns to mathematical equation (3). The output amplitude $b_2$ may be solved in a procedure similar to that given for the symmetric case. After lengthy calculations, the final result is surprisingly simple as represented by mathematical equation (14).

$$b_2 = e^{i\phi}\left[-1 + \frac{1 + \cos(\kappa, L)}{[1 - \cos(\kappa_+ L)][\rho_1^2/\Delta u_1 + \rho_3^2/\Delta u_3] + 1}\right], \quad (14)$$

where $\Delta u_n$ are defined the same way as in the symmetric case. By comparing mathematical equation (14) and mathematical equation (8), it is evident that all asymmetry effects may be effectively factored into the term expressed by mathematical equation (15).

$$\rho_1^2/\Delta u_3 + \rho_3^2/\Delta u_3 = \frac{\kappa_{12}^2 e^{i\phi + i\theta_1}\eta_1}{1 - e^{i\phi + i\theta_1}\eta_1} + \frac{\kappa_{23}^2}{\kappa_+^2}\frac{e^{i\phi + i\theta_3}\eta_3}{1 - e^{i\phi + i\theta_3}\eta_3}. \quad (15)$$

As a consequence, for reasonable asymmetries in the coupling constants and resonator quality factors, there exists a pair of phases $\Delta\theta_1$ and $\Delta\theta_3$ such that the output amplitude $b_2$ vanishes. The required phase variations are plotted against the asymmetric coupling ratio, $\kappa_{23}/\kappa_{12}$, in FIG. 4(a) for up to 50% asymmetry. As $\Delta\theta_1$ and $\Delta\theta_3$ generally have opposite signs, $\Delta\theta_1$ is plotted against $-\Delta\theta_3$ to better illustrate the deviation from symmetry. Note that $\Delta\theta_1 = -\Delta\theta_3$ may be required for $b_2 = 0$ in a symmetric structure ($\kappa_{23}/\kappa_{12} = 1$), according to mathematical equations (9) and (10). The difference between $\Delta\theta_1$ and $-\Delta\theta_3$ becomes larger as the asymmetry increases.

Figure 8:
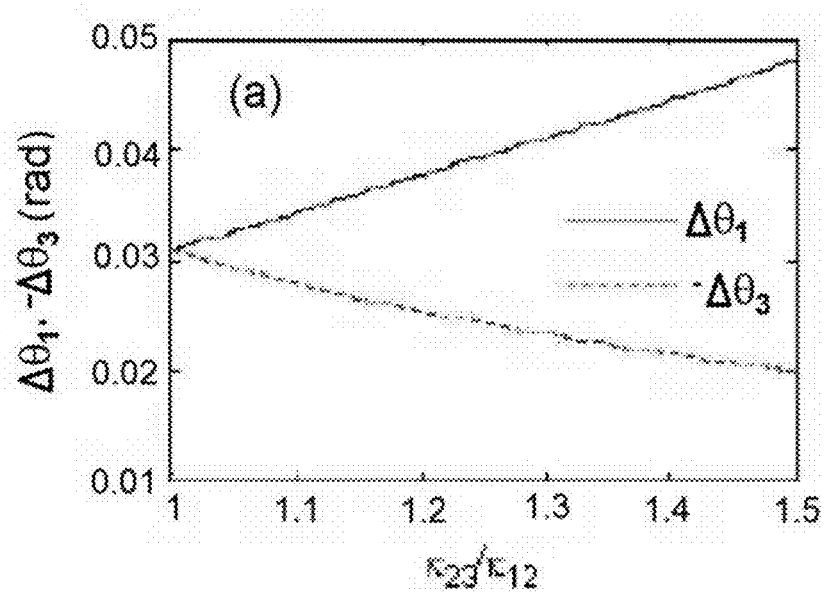
FIG. 8 provides a graph that is useful for understanding that asymmetric phase shifts (through different DC biases applied to the two resonators of FIG. 1) may be introduced to recover the low intensity states ($b_2 \sim 0$).
Figure 9:
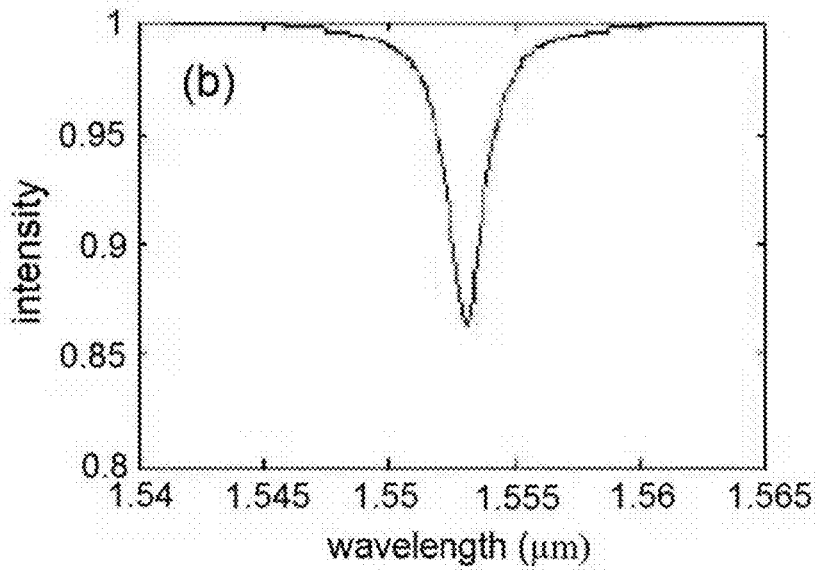
FIG. 9 provides a graph illustrating an un-modulated output spectrum for a worst case scenario ($\kappa_{23}/\kappa_{12}=1.5$).

FIG. 8 shows that although it is not easy to directly compensate the asymmetric coupling constants themselves, asymmetric phase shifts (through different DC biases applied to the two resonators) may be introduced to recover the low intensity states ($b_2 \sim 0$). The un-modulated output spectrum for the worst case ($\kappa_{23}/\kappa_{12} = 1.5$) is illustrated in FIG. 9 and shows no anomaly. However, the intensity variation upon refractive index modulation shows obvious distortion from the symmetric case. Nonetheless, two features remain: (1) there are two points with relatively small index changes ($\pm 2.2 \times 10^{-4}$, $\mp 5.4 \times 10^{-4}$) where the intensity vanishes; (2) the intensity varies significantly in the push-pull configuration and much less otherwise. The coverage on the complex E plane is slightly enhanced, although a small hole exists at a large amplitude value, which may limit the maximum accessible amplitude to 0.78 for a generic M-ary modulation format.

The effects of asymmetric quality factors are illustrated in FIGS. 12-15. The required phase shifts, $\Delta\theta_1$ and $-\Delta\theta_3$, for vanishing $b_2$, are plotted against the ratio of the quality factors in FIG. 12. The unloaded quality factor $Q_1$ is fixed at its original value $\sim 2.5 \times 10^4$.

Figure 10:
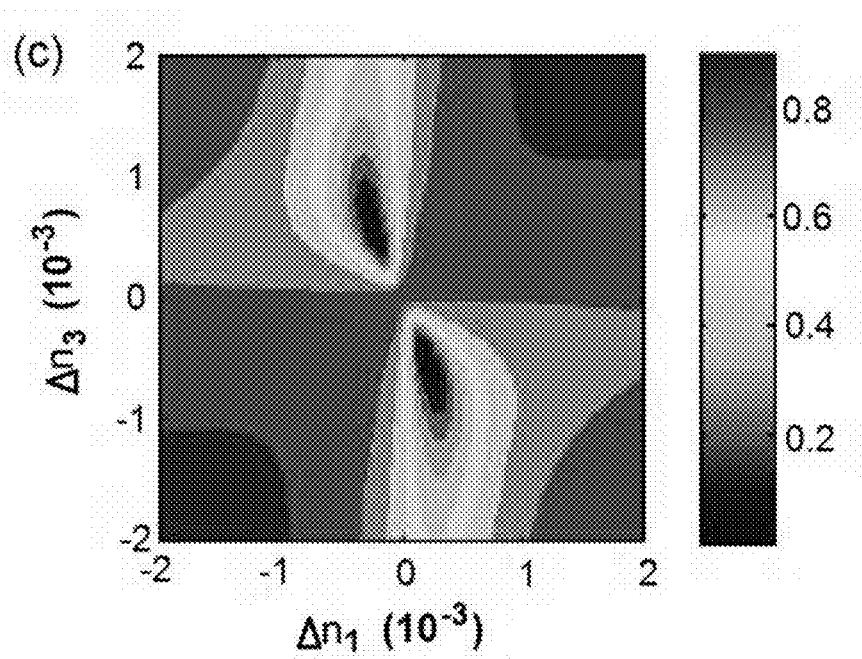
FIG. 10 provides a graph showing an intensity variation with index modulation.
Figure 11:
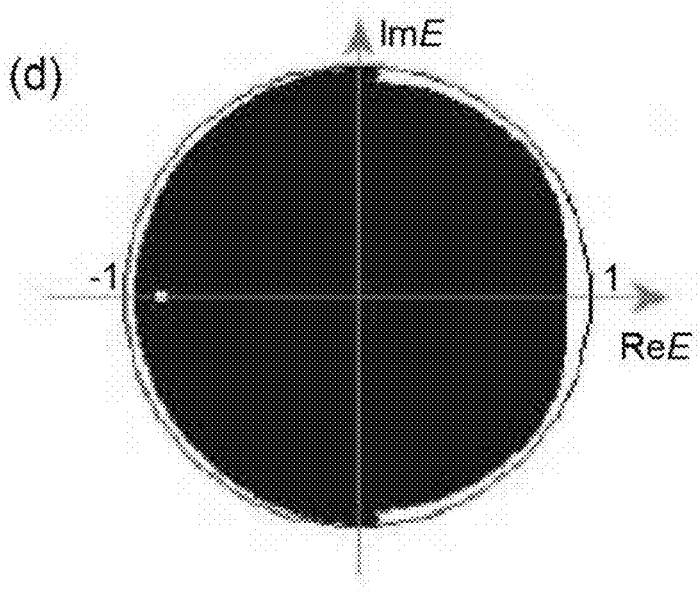
FIG. 11 provides a graph showing a mapping of an output field on a complex plane.
Figure 12:
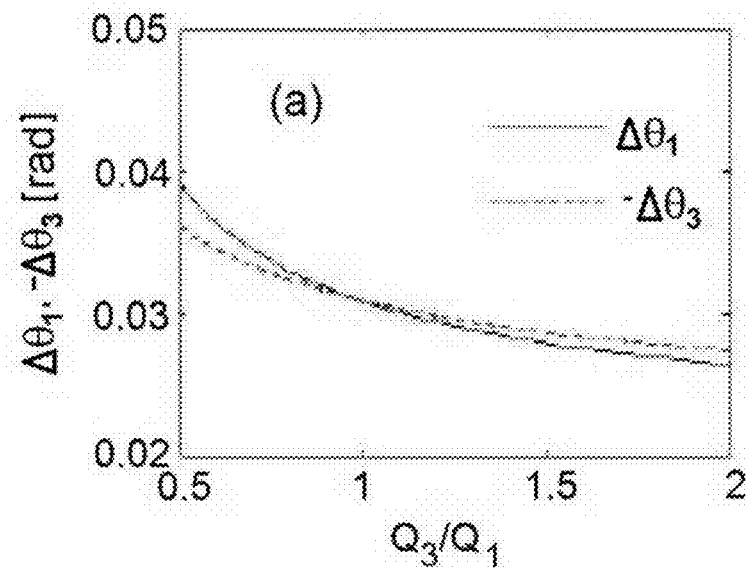
FIG. 12 provides a graph showing phase compensation in each resonator for asymmetry in the quality factors.
Figure 13:
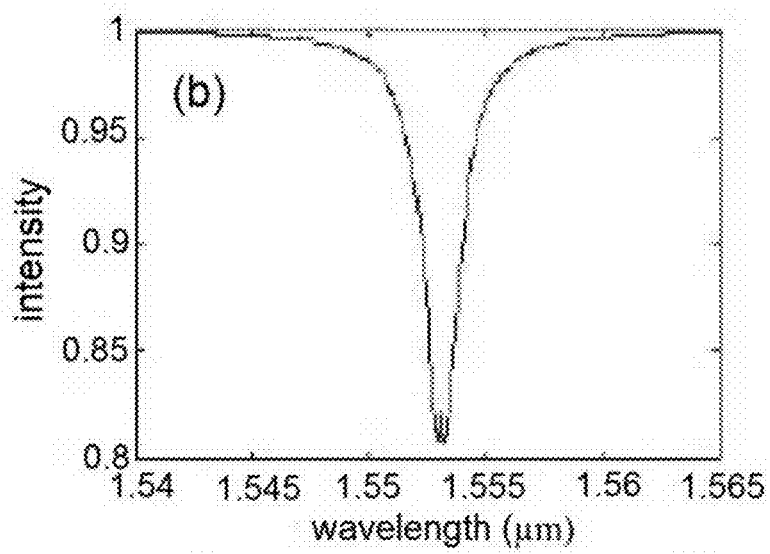
FIG. 13 provides a graph showing an output spectrum.
Figure 14:
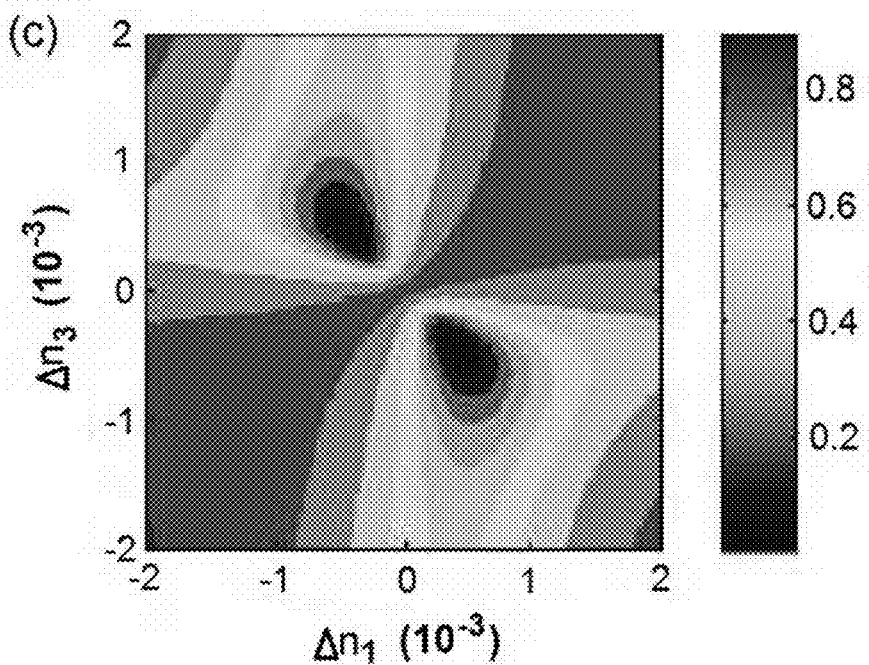
FIG. 14 provides a graph showing an intensity variation with index modulation.
Figure 15:
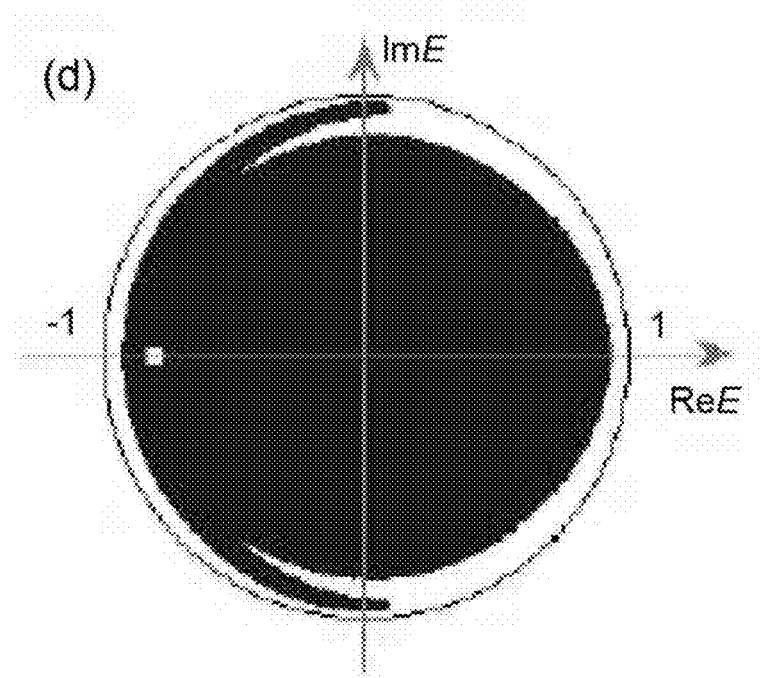
FIG. 15 provides a graph showing a mapping of an output field on a complex plane.

Note that $\Delta\theta_1 = -\Delta\theta_3$ for the case of $Q_3/Q_1 = 1$ in accordance to the symmetric case. The un-modulated output spectrum for the worst case ($Q_3/Q_1 = 0.5$) is illustrated in FIG. 13. A small yet noticeable spike appears at the resonance due to the asymmetric quality factors of the two racetrack resonators. The modulated intensity variation upon refractive index modulation depicted in FIG. 14 shows less severe distortion compared to the distortion observed in the FIG. 10. Again, two features remain: (1) there are two points with relatively small index changes ($\pm 4.4 \times 10^{-4}$, $\mp 4.1 \times 10^{-4}$) where the intensity vanishes; (2) the intensity varies significantly in the push-pull configuration and much less otherwise. The coverage on the complex E plane slightly deteriorates. There exists a small hole, which may limit the maximum accessible amplitude to 0.74 for a generic M-ary modulation format.

Note that the evolution from symmetry to the worst case asymmetry is gradual. For example, the two "eyes" in FIG. 10 gradually narrow as the asymmetry in the coupling constant worsens. Also, the centers of the "eyes" rotate clockwise around the origin ($\Delta n_1 = \Delta n_3 = 0$). As the asymmetry in the quality factors worsens, the "eye" centers do not narrow or rotate substantially although there are some deformations.

Overall, the asymmetry analysis presented above show that substantial asymmetries in coupling constants and quality factors of the two racetrack resonators 102, 104 may be compensated by refractive index changes on the order of $4 \times 10^{-4}$, which may be readily provided with a low-power heater or a small change of the DC bias. Fundamentally, such compensations are possible because all these asymmetries enter the output amplitude defined by mathematical equation through the term given in mathematical equation (15). For structures with asymmetric q's or Q's, asymmetric phase shifts may restore the value of the term given in mathematical equation (15) to a corresponding symmetric structure. Specifically, to achieve vanishing output intensity under modulation, a structure with 50% asymmetry in the coupling constant may require $(\Delta n_1, \Delta n_3) = (\pm 2.2 \times 10^{-4}, \mp 5.4 \times 10^{-4})$ whereas a symmetric structure may require $(\Delta n_1, \Delta n_3) = (\pm 3.5 \times 10^{-4}, \mp 3.5 \times 10^{-4})$. The difference between $|\Delta n_1|$ and $|\Delta n_3|$ in the asymmetric case is used to restore mathematical equation (15) to the value of the symmetric case such that $b_2 = 0$.

In general, an encoder is needed to convert an original M-ary digital signal into the driving signal for the modulator. Consider the case of a QPSK signal with four symbols shown in FIG. 7(a). The encoder will have a two-bit input and two output ports. Each output port has four output voltage levels. Under the given specifications (resolution, signal-to-noise ratio, bandwidth, driving power, etc.), this encoder may be easily architected and implemented as a high-speed digital-to-analog data converter, which may be fabricated economically using the SOI technology together with the PCDR micro-resonator 100. Note that a conventional nested Mach-Zehnder QPSK modulator needs two output voltage levels for each port. The additional voltage levels required for the proposed QPSK modulator will somewhat increase the size of the driving circuitry. However, electronic devices such as transistors are generally significantly smaller than photonic devices. Therefore, the enlargement of the driving circuitry is usually negligible compared to the significant space saving offered by changing from a bulky nested Mach-Zehnder modulator to the proposed dual racetrack resonators 102, 104.

For example, the structure as described herein may be easily extended to achieve high-order QAM with a large number of output states (e.g., 16-QAM, 256-QAM) without adding additional resonators. While prior approaches require many more resonators for 16-QAM and 256-QAM, the structure as described herein may utilize larger encoders to achieve such results. This provides an advantage as electronic devices such as encoders are generally much smaller than photonic devices such as resonators. For example, a typical resonator may have a surface area greater than 50 um$^2$, whereas a typical transistor may have a surface area of less than 1 um$^2$. Thus, for 16-QAM and 256-QAM, devices using the structures and techniques as described herein may be manufactured on a smaller scale than devices using existing techniques.

Figures 16, 17:
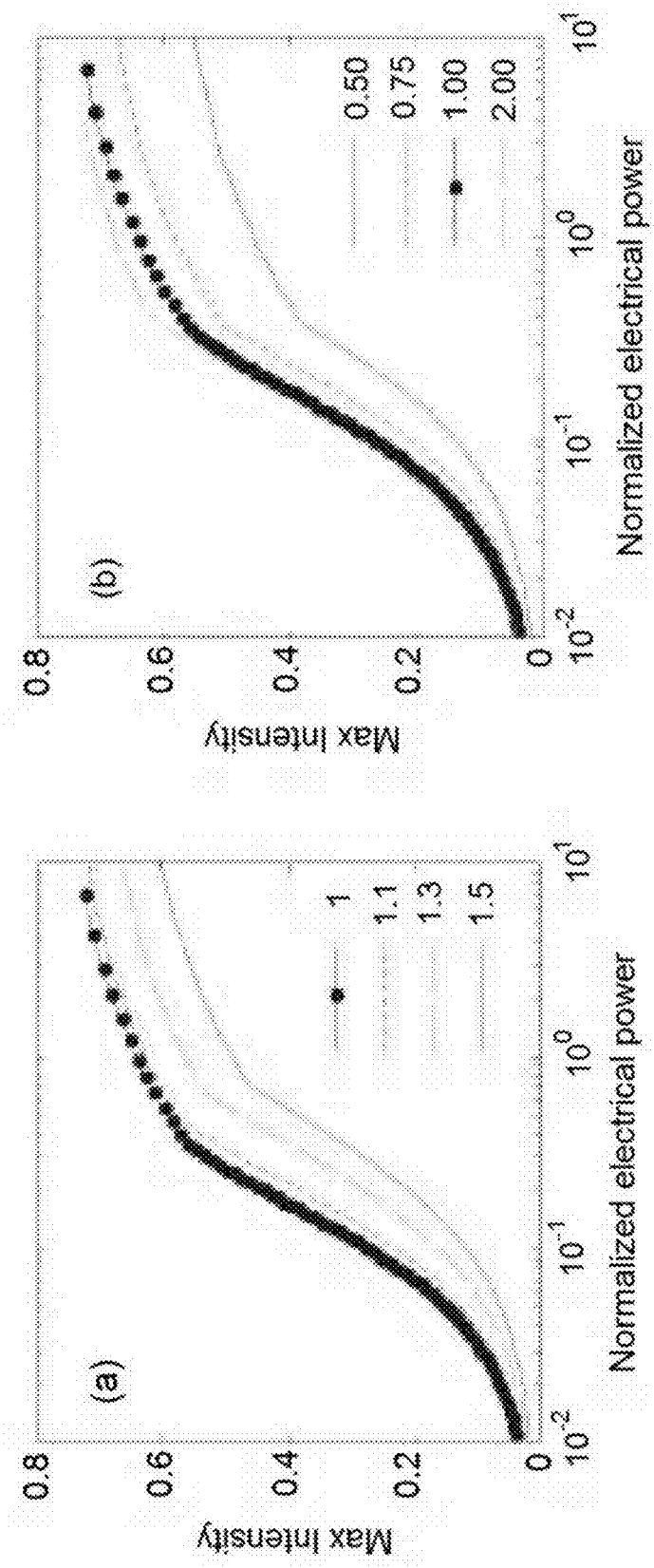
FIGS. 16-17 provide graphs that are useful for understanding an output intensity as a function of a driving power for parallel-coupled dual racetrack modulators with varying degrees of symmetry.

Driving voltages and power consumption are important issues for silicon modulators used in optical interconnects. For a nested Mach-Zehnder QPSK modulator which is biased across the minimum point of the transfer curve, a lower driving voltage and lower RF power consumption may be achieved at the expense of a lower maximum output intensity (which entails a trade-off with the detector sensitivity or the input laser power). For the proposed parallel-coupled dual racetrack modulator, a similar power reduction scheme is possible. For simplicity, silicon racetrack resonators with embedded MOS capacitors are considered in which an index change is approximately linearly dependent on the voltage. As illustrated in FIG. 16, the driving power may be significantly lower at lower output intensity. Asymmetries of the coupling constants and quality factors could entail extra power penalty but the power remains reasonable. According to FIGS. 16-17, if the asymmetry is large, electrical power penalty is significantly lower when the modulator operates at a lower output intensity level. Therefore, for a modulator that happens to have a large asymmetry due to imperfection in fabrication, the balance of the power trade-off may tip towards enhancing the detector sensitivity.

In sum, the present disclosure concerns a parallel-coupled dual racetrack micro-resonator modulator for arbitrary M-ary quadrature signal generation. The critical coupling condition is obtained for such a structure. The intensity and phase modulations are obtained by varying the refractive indices of the silicon waveguides in the two parallel-coupled resonators. A push-pull configuration effectively modulates the intensity and phase. An over-coupling scenario of a parallel-coupled dual racetrack resonator structure results in adequate coverage for arbitrary M-ary quadrature signal generation. The interaction between the parallel-coupled racetrack resonators is key to the coverage of the complex E plane. In an over-coupled dual racetrack structure, a delicate balance is achieved between the direct sum and the interaction of the two racetrack resonances, which results in a large dynamic range of the output amplitude and phase. Particularly, the modulated intensity may reach zero in a push-pull configuration although the intensity of the un-modulated over-coupled racetrack resonators do not vanish at any wavelength. Despite the distortion of the intensity and phase mapping, small refractive index changes may be readily obtained with a reasonable thermal or electrical bias and may be used to compensate the asymmetry. The coverage of the complex E plane remains sufficient despite asymmetries.

While various embodiments of the present disclosure have been described above, it should be understood that they have been presented by way of example only, and not limitation. Numerous changes to the disclosed embodiments can be made in accordance with the disclosure herein without departing from the spirit or scope of the disclosure. Thus, the breadth and scope of the present disclosure should not be limited by any of the above described embodiments. Rather, the scope of the disclosure as presented herein should be defined in accordance with the following claims and their equivalents.

What is claimed is:

1. An apparatus for modulating an amplitude and a phase of light, comprising:
   a waveguide capable of transmitting light therethrough;
   at least two micro-resonators (1) located on opposite sides of the waveguide, (2) symmetrically side-coupled in parallel through the waveguide, and (3) having at least one parameter deviation in at least one resonator characteristic as a result of material or manufacturing imperfections; and
   an electronic structure, formed in each of said micro-resonators, that is electrically biased to dynamically vary at least one of an amplitude and a phase of light so as to cause electro-optic modulation of the amplitude and the phase of the light, wherein each bias voltage for the electronic structure comprises a numerical offset that is determined based upon the at least one parameter deviation.

2. The apparatus according to claim 1, wherein the resonator characteristic comprise an effective optical path length, a quality factor or a coupling: constant between one of the micro-resonators and the waveguide.

3. The apparatus according to claim 1, wherein the electronic structure is controlled by an electronic encoder having a plurality of digitized output voltage levels.

4. The apparatus according to claim 3, wherein the electronic encoder is formed adjacent to micro-resonators.

5. The apparatus according to claim 1, wherein the electronic structure comprises at least one of a diode and a capacitor.

6. The apparatus according to claim 1, wherein the waveguide and the micro-resonators are formed on a wafer comprising at least one semiconductor.

7. The apparatus according to claim 1, wherein the waveguide and the micro-resonators are formed in a silicon layer of a silicon-on-insulator wafer.

8. The apparatus according to claim 1, wherein the waveguide and the micro-resonators are formed in different layers of a multi-layer structure.

9. The apparatus according to claim 3, wherein the amplitude and phase of light signals exiting the apparatus are switched between a discrete number of values, the number of values of amplitude and phase depending directly upon a number of output voltage levels of the electronic encoder.

10. The apparatus according to claim 1, wherein the apparatus is used as at least one of a phase shift keying modulator and a quadrature amplitude modulator.

11. A resonator, comprising:
    a substrate;
    a waveguide formed on the substrate and capable of allowing a transmission of a light signal therethrough;
    at least two racetrack resonators (1) formed on the substrate so as to be located on opposite sides of the waveguide such as to enable optical coupling between the racetrack resonators and the waveguide and (2) having parameter deviations in at least one resonator characteristic;
    a first set of electrical contacts disposed adjacent to a first resonator of the racetrack resonators; and
    a second set of electrical contacts disposed adjacent to a second resonator of the racetrack resonators;
    wherein at least one of an amplitude and a phase of the light signal is dynamically varied, by an electrically biased electronic structure, so as to cause an electro-optic modulation of the amplitude and phase of the light signal; and
    wherein each bias voltage of the first and second sets of electrical contacts comprises a numerical offset that is determined based upon the parameter deviations in at least one resonator characteristic.

12. The resonator according to claim 11, wherein the resonator characteristic comprises at least one of an effective optical path length, a quality factor and a coupling constant between an racetrack resonator and the waveguide.

13. The resonator according to claim 11, wherein at least one electrical contact of the first or second sets of electrical contacts at least partially encompasses a respective one of the first and second resonators.

14. The resonator according to claim 11, wherein at least one electrical contact of the first or second sets of electrical contacts is disposed within a respective one of the first and second resonators.

15. The resonator according to claim 11, wherein the substrate comprises a semiconductor wafer.

16. The resonator according to claim 11, wherein the wave aide and racetrack resonators are formed in a silicon layer of a silicon-on-insulator wafer.

17. The resonator according to claim 11, wherein the substrate is a multi-layer substrate, and the waveguide and racetrack resonators are formed in different layers thereof.

18. The resonator according to claim 11, wherein amplitude and phase of light signals exiting the resonator are switched among a discrete number of values, the number of values of amplitude and phase depending directly upon a number of voltage levels supplied by an encoder to be the bias voltage of each electronic structure, the encoder being located on the substrate or out of the substrate.

19. The resonator according to claim 11, wherein the resonator is used as at least one of a phase shift keying modulator and a quadrature amplitude modulator.

* * * * *